3,560,424
SHRINK-PROOFING PROCESS
John H. Glaser, Waltham, and Basil Yankopoulos, Taunton, Mass., assignors to Amicon Corporation, Lexington, Mass.
No Drawing. Filed July 22, 1968, Ser. No. 746,250
Int. Cl. C08f 33/02, 45/54
U.S. Cl. 260—29.6                                   1 Claim

ABSTRACT OF THE DISCLOSURE

A novel process, and the novel products produced thereby, wherein hydrogels of the type having not more than very limited covalent cross linking—and most advantageously no covalent cross-linking at all—are treated with ceric ion solution in an acid medium, and thereby made shrink resistant. The process is most suitable for use in shrink-proofing ionically-crosslinked materials like polyelectrolyte complex resins.

BACKGROUND OF THE INVENTION

Polyelectrolyte complex resins and gels prepared therewith are known to the art and have been described in an article by Alan S. Michaels, which article was entitled "Polyelectrolyte Complexes" and appeared in Industrial & Engineering Chemistry in October 1965.

As described in that article, and elsewhere in the literature, such materials are of a great deal of interest as veterinary and medical materials, for example, for use as contact lenses, surgical adhesives, nonthrombogenic coatings and the like. One of the most important properties of the material in such uses is its high permeability to oxygen, moisture vapor, etc. It has been known that such permeability was greatly enhanced by increasing the water content of polyelectrolyte complex resin-water gels, but gels of stable water composition were not formed much above 80% water and, to the extent they could be formed, were relatively weak in mechanical properties, and susceptible to shrinkage on exposure to heat, therefore of rather limited utility. One example of the instability of such gels hereinafter called "hydrogels" is the fact that upon treating a film of about 80% water content (e.g., a film sold under the trade name Biolon by Amicon Corporation) in boiling water, the film tended to revert to a much lower and more stable form having only about 30 to 40% water content. Not only is this decrease in water accompanied by a decrease in permeability characteristics, but it is also accompanied by an undesirable shrinkage. Two specific applications where such a change can destroy the utility of the film are contact lenses and dialysis membranes.

SUMMARY OF THE INVENTION

Therefore, it is an object of the invention to provide a process for forming hydrogel articles of substantially stable water content.

Another object of the invention is to provide a process for shrink-proofing hydrogel articles.

A particular object of the invention is to provide an improved polyelectrolyte complex resin-water gel film.

Other objects of the invention will be obvious to those skilled in the art on reading the instant application.

It has now been found that the treatment of hydrogels with solutions of ceric salts, when carried out at relatively low pH levels, results in the formation of dimensionally-stable (i.e. shrink-resistant) materials which maintain a high water content even though they may be boiled in water or subjected to heat in a warm air oven. Such films also maintain excellent moisture vapor and oxygen permeabilities after subjection to the aforesaid type of heat treatments.

Any ceric salt which may be solubilized to a reasonable extent is useful. Water solutions are, of course, the preferred reaction mediums because it is usually water with which one wishes to permeate a gel and because water is a very convenient solvent. Among the ceric salts which may be used are such inorganic salts as ceric ammonium nitrate, ceric hydroxy nitrate, ceric ammonium pyrophosphate, ceric iodate, and the like. Organic ceric salts which are soluble at low pH's and thereby provide a supply of ceric ions, may also be used.

The pH level of the liquid medium in which the treating process takes place is below a pH of about 4, advantageously at a pH below 3 to obtain the best reaction rates and the most suitably-treated hydrogel products. By hydrogel is meant hydrogels formed by organic polymer and water. The benefits of the invention are especially realized in treating ionically cross-linked hydrogels such as the polyelectrolyte complex resins or other hydrogels having little covalent cross-linking. The invention is not of any particular interest for use wtih hydrogels having a higher covalent cross-linking density.

It is sometimes desirable to use small quantities of monomer in the treating process. Usage of a monomer is an aid in achieving uniform products, but is not essential as will be demonstrated by the working examples set forth below. The use of monomers in the process is especially advantageous when the process is carried out on ultrafiltration membranes to stabilize them against shrinkage and to improve their chemical resistance and/or to modify their rejection characteristics by making their effective pore size smaller. All of these processes and the results achieved thereby are important aspects of the instant invention.

The acidification of the medium in which the process of the invention is to be carried out can be achieved by any customary expedient. Use of nitric acid is usually convenient. However, other acids such as sulphuric acid, acetic acid and hydrohalic acids such as hydrochloric acid may also be used, and those skilled in the art may generally select whatever acid suits their particular purpose.

Among the monomers of satisfactorily high water solubility which may be used in the reaction mix when desired are ethylenically saturated monomers such as acrylic compounds like acrylic acid and its homologs such as methacrylic acid, α-methacrylic acid, α-chloroacrylic acid, acrylamide, methacrylamide, diacetone acrylamide, nitriles such as acrylonitrile, methacrylonitrile, and the like; allylic compounds such as allyl acrylate, diallyl carbonate, allyl acetate, diallyl maleate may be used; so may divinylsulfide, vinylalkylethers, divinysulfone, vinyl pyridine and the like. In solutions containing organic solvents instead of or in addition to water, there may also be used monomers such as vinylidene chloride, isoprene, chloroprene, and styrene. This varied list of monomeric materials is intended to be illustrative of the wide scope of monomers which may be utilized in the practice of the invention. It is not meant to be restrictive but only suggestive of the flexibility one skilled in the art will have on adapting the process of the invention to his own advantage in view of the particular problems with which he may be faced.

When such monomers are used, it is usually most convenient to utilize a redox-type catalyst system. The reducing agent can conveniently be incorporated, along with the monomer, into the ceric-treating solution. Among suitable reducing agents are sodium metabisulfite, ascorbic acid, alcoholic reducing agents known to the art and the like. The ceric ion itself seems to act as the oxidizing agent.

Applicants do not know the mechanism by which their invention achieves its beneficial effects. Control examples are presented to show that it does not depend upon any graft-polymerization reinforcement and, in any event, the graft-polymerizations suggested by Mino et al. in U.S. Pat. 2,922,768 are not possible with polyelectrolyte complex resins formed by the ionic cross-linking of poly(sodium styrene sulfonate) and poly(vinylbenzyltrimethyl ammonium chloride) such as used in the examples presented below. It appears that the mechanism may involve a cross-linking of the hydrogel structure, thus making it more resistant to collapse of the structure upon dehydration.

Among the dissociable polyanions which may be used in preparing the polyelectrolyte complex resin which may be treated by the process of the invention are poly(alphafluoro acrylic acid), poly(2,2-dichloro-3 butenoic acid), poly(4-vinyl-phenyl difluoro acetic acid), polyvinyl sulfuric acid, polyvinyl sulfonic acid, polyvinyl methylol sulfonic acid, poly-alpha-methylstyrene sulfonic acid, poly(styrene sulfonic acid), and the dissociable salts of such acids, preferably the sodium, potassium or ammonium salts thereof. Of these the sulfonic acid polymers and their alkali metal salts are most advantageous.

Among the dissociable polycations which may be used as ingredients in preparing the ionically cross-linked polyelectrolyte complex resins which may be treated by the process of the invention are poly(vinylbenzyltrimethyl ammonium chloride), poly(ethylene methyloxonium) chloride, poly(vinyl dimethyloxonium) chloride, poly(vinyl benzyldimethyl sulfonium) chloride, poly(vinyl benzyltrimethyl phosphonium) chloride, poly(vinyl dimethyloxonium) chloride, polyvinyl pyridinium chloride, poly(diallyl dimethyl ammonium chloride), the heterocyclic amine polycation sold under the trade designation Ionac PP-2021 by Ionac Corporation, a Division of Ritter-Pfaudler, Inc., and the like. Of these the quaternary ammonium compounds are most advantageous.

ILLUSTRATIVE EXAMPLES OF THE INVENTION

Example 1

Example 1 is not illustrative of the invention but is of a control procedure whereby it is demonstrated that mere graft polymerization on the surface and in the interior of a hydrogel film will not provide the benefits achieved by practice of the invention:

A one-inch square of hydrogel membrane, formed of a polyelectrolyte complex resin and sold under the trade designation Biolon by Amicon Corporation, containing 80% by weight of water was soaked for one hour at room temperature in an aqueous solution comprising 1% of acrylic acid and 1% of sodium metabisulfite as a reducing agent. Thereupon, this film was removed from the monomer solution and placed in an aqueous solution of 1% acrylic acid and 1% ammonium persulfate oxidizing agent, for one hour at 40° C.

After this treatment, during which polyacrylic acid was formed on the surfaces and in the interior of the membrane, the membrane was boiled for 5 minutes in a 10% aqueous NaCl solution. This latter treatment caused the membrane to shrink about 50% in area despite the presence of the polyacrylic acid polymer thereon.

Example 2

This example illustrates the use of a monomer in the process of the invention.

Another one-inch square of the same polyelectrolyte complex resin hydrogel membrane used in Example 1 was soaked for about 16 hours at 25° C. in a 0.1 N nitric acid in a solution also comprising 1% by weight of acrylic acid and 1% by weight of ceric ammonium nitrate.

When the resultant film was rinsed in running water and boiled for 5 minutes in an aqueous solution of 10% NaCl, it did not shrink to any significant extent.

Example 3

This example illustrates an embodiment of the invention wherein no monomer is utilized.

A one-inch square of another sample, of the same membrane product used in Example 1 was soaked for an hour in a 1% solution of 0.5 N ceric ammonium nitrate at 25° C. After this, the film was rinsed in running water for 30 minutes. Thus treated, the film could be boiled in water in a 10% aqueous solution of NaCl without shrinking. Water content of the treated film was, after the boiling treatment, still about 76%. A control film, i.e. untreated film also boiled in a 10% aqueous solution of NaCl for 10 minutes, shrunk to less than one-half of its original area.

The process of the invention is highly advantageous and particularly adaptable for forming improved articles of polyelectrolyte complex resin sheet goods, and in particular contact lenses and dialysis membranes which also are made more easily sterilizable and useful at higher processing temperatures.

What is claimed is:

1. In the process for rendering shrink-resistant an ionically cross-linked polyelectrolyte complex resin of a polymer of sodium styrene sulfonate and a polymer of vinylbenzyltrimethyl ammonium chloride, the improvement which comprises soaking said resin in an aqueous solution of a ceric salt having a pH below 4.

References Cited

UNITED STATES PATENTS 2,922,768  1/1960  Mino et al. _ 260—29.6EMM(X)
3,220,960  11/1965  Wichterle et al. _ 260—29.6H(X)

OTHER REFERENCES

"Polyelectrolyte Complexes" by Alan Michaels, Industrial and Engineering Chemistry, vol. 57, No. 10, October 1965, pp. 32–40. (Copy in Scientific Library).

JULIUS FROME, Primary Examiner

J. B. LOWE, Assistant Examiner